United States Patent

Tamura et al.

[11] Patent Number: 5,147,684
[45] Date of Patent: Sep. 15, 1992

[54] FORMING METHOD OF MAGNETIC RECORDING MEDIUM PROTECTIVE FILM

[75] Inventors: Hideharu Tamura, Katano; Kazufumi Ogawa, Hirakata, both of Japan

[73] Assignee: Matsushita Electric Industrial Co., Ltd., Osaka, Japan

[21] Appl. No.: 768,468

[22] Filed: Sep. 30, 1991

Related U.S. Application Data

[63] Continuation of Ser. No. 574,378, Aug. 28, 1990, abandoned, which is a continuation of Ser. No. 303,657, Jan. 30, 1989, abandoned.

[30] Foreign Application Priority Data

Jan. 29, 1988 [JP] Japan ................................. 63-20491

[51] Int. Cl.$^5$ .............................................. B05D 5/12
[52] U.S. Cl. ................................... 427/131; 427/132; 428/64; 428/695; 428/900
[58] Field of Search ................. 427/131, 132; 428/695, 428/900, 64

[56] References Cited

U.S. PATENT DOCUMENTS 4,069,360  1/1978  Yanagisawa et al. .......... 427/131 X

FOREIGN PATENT DOCUMENTS 0282188  9/1988  European Pat. Off. .
59-188826  3/1985  Japan .

*Primary Examiner*—Bernard Pianalto
*Attorney, Agent, or Firm*—Wenderoth, Lind & Ponack

[57] ABSTRACT

This invention is to present a magnetic recording medium protective film possessing a metal oxide film on the surface of a magnetic disc substrate, and having a silane monomolecular adsorption film formed on this metal oxide film by chemical adsorption.

According to this invention, the monomolecular adsorption film can be formed on the surface of magnetic recording medium without pinhole and in uniform thickness, which may contribute to improvement of the slipping property of the magnetic head, that is, enhancement of the wear resistance, so that a magnetic recording medium of high density, high reliability, and high performance may be realized.

2 Claims, 3 Drawing Sheets

FORMING METHOD OF MAGNETIC RECORDING MEDIUM PROTECTIVE FILM

This application is a continuation of now abandoned application, Ser. No. 07/574,378 filed Aug. 28, 1990, which was a continuation of now abandoned application, Ser. No. 07/303,657 filed Jan. 30, 1989.

BACKGROUND OF THE INVENTION

This invention relates to a forming method of a magnetic recording medium protective film characterized by forming a monomolecular adsorption film on a substrate of magnetic recording medium by chemical reaction after preliminarily forming a metal oxide film thereon.

Hitherto, for practical use of magnetic disc developed in the field of electronics, enhancement of wear resistance of the magnetic substrate surface has been indispensable in performance.

For example, a magnetic recording substrate composed of chromium (Cr), nickel (Ni) and cobalt (Co) is very soft on the surface in its structure made of these components alone, and the wear resistance of the substrate surface must be improved by coating with a lubricant after evaporating carbon.

Since the conventional protective films of magnetic recording substrate were formed by coating with a lubricant in the manufacturing process, the uniformity of the film thickness on the substrate was poor, the adhesion between the substrate and film was inferior, and the durability was low.

On the other hand, it had been also attempted to use a chemical adsorption film as the protective film of magnetic recording substrate (e.g. U.S. Pat. No. 4,761,316), but since the adsorption film was formed on the substrate without forming an oxide film which is indispensable for adsorption reaction, the molecular density in the adsorption film was very low and, consequently, the wear resistance was poor, and it was not sufficient as a lubricating film.

SUMMARY OF THE INVENTION

To solve the above problems, this invention involves the following means. In other words, the forming method of magnetic recording medium protective film of the invention is intended to form a silane (or fluorosilane) monomolecular adsorption film chemically and at high density on the substrate surface after preliminarily forming a metal oxide film thereon.

According to this invention, because of the chemical bonding with the substrate surface at high density at the molecular level (covalent bonding), a wear resistant protective film can be formed on the magnetic recording medium substrate, semipermanently, rigidly, and in a uniform thickness of monomolecular film.

DETAILED DESCRIPTION OF THE INVENTION

Figure 1A:
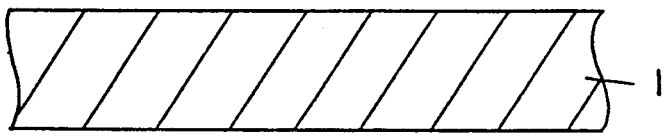
FIG. 1 is a process chart of a first embodiment of the invention.
Figure 1B:
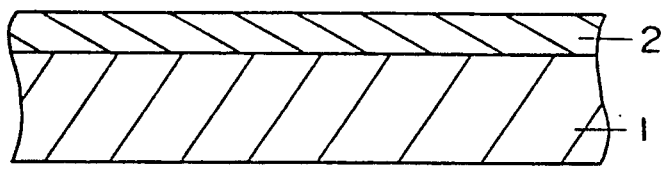
Figure 1C:
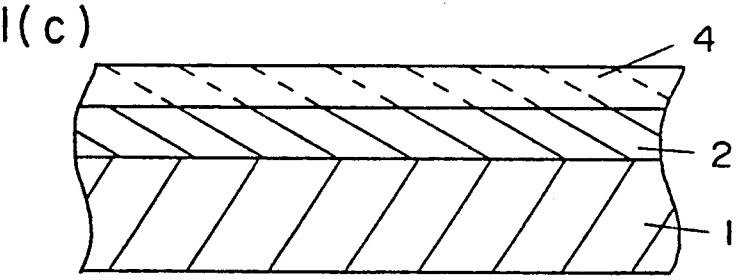
Figure 1D:
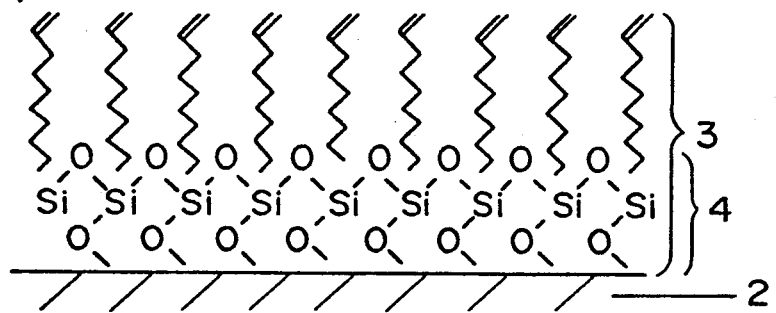

Referring now to the drawings, the invention is further described below.

In the first embodiment shown in FIG. 1, first as shown in (a) the surface of a substrate 1 of magnetic recording medium made of chronium (Cr), nickel (Ni) and others is degreased and cleaned by using trichloroethylene or the like, and a metal oxide film MeOx 2 is formed by sputtering or other method as shown in (b). Next, as shown in (c), by chemical adsorption method, a monomolecular adsorption film 3 of

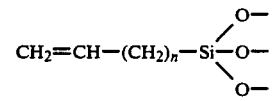

is formed by adsorption reaction on the surface of MeOx 2, by using a silane surface active agent (for example, $CH_2=CH-(CH_2)_n-SiCl_3$, where n is an integer preferably from 10 to 30, and $CH_2=CH-$ may be replaced by $CH\equiv C-$ or $CH_3-$).

For example, when immersed in a solvent solution comprising 80% n-cetane, 12% carbon tetrachloride and 8% chloroform dissolved at a concentration of $2.0\times10^{-3}$ to $5.0\times10^{-2}$ (mol/l), bonds of

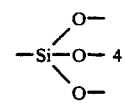

are formed on the surface of MeOx 2 as shown in FIG. 1 (d), and the molecules of the silane surface-active agent are uniformly arranged at high density at the molecular level on the surface of the MeOx 2, and by this process the surface of the magnetic recording substrate 1 containing the monomolecular adsorption film 3 comes to present an excellent wear resistance. Thus, when formed on a metal oxide film such as MeOx, the bonds 4 are formed on the surface, so that an excellent monomolecular adsorption film 3 may be formed.

In the second embodiment, instead of the monomolecular adsorption film 4 used in the first embodiment, a fluorosilane surface active agent having a fluorine atom at the molecular end is used, for example,

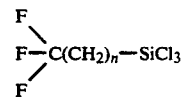

Figure 2A:
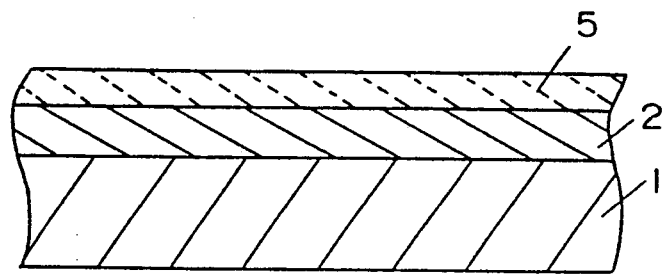
FIG. 2 is a process chart of a second embodiment of the invention.
Figure 2B:
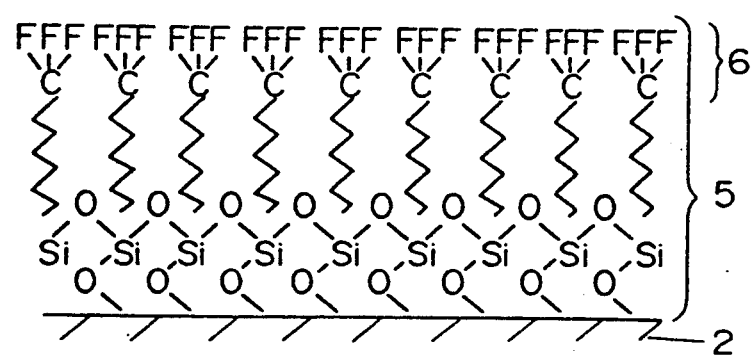

(where n is an integer, preferably 10 to 30), and in the same process as in the first embodiment, an adsorption reaction is effected on the surface of MeOx 2 as shown in FIG. 2(a), and a monomolecular adsorption film 5 is formed. In this monomolecular adsorption film 5, as shown in FIG. 2 (b), bonds 6 of

are arranged at high density on the surface of MeOx 2. Generally, the $-CF_3$ group has a higher wear resistance than the hydroxyl group, and therefore by this process, the surface of the magnetic recording substrate 1 containing the film 5 comes to have an excellent wear resistance.

Meanwhile, as the metal oxide film MeOx in the foregoing embodiments of the invention, oxide films of molybdenum (Mo), titanium (Ti), tungsten (W) and others may be used. In the two embodiments illustrated herein, the protective film was formed after forming a metal oxide film on the magnetic recording substrate, but it may be also possible to a metal film instead of the metal oxide film, and form a protective film on the metal oxide film which is naturally formed on that surface.

Figure 3:
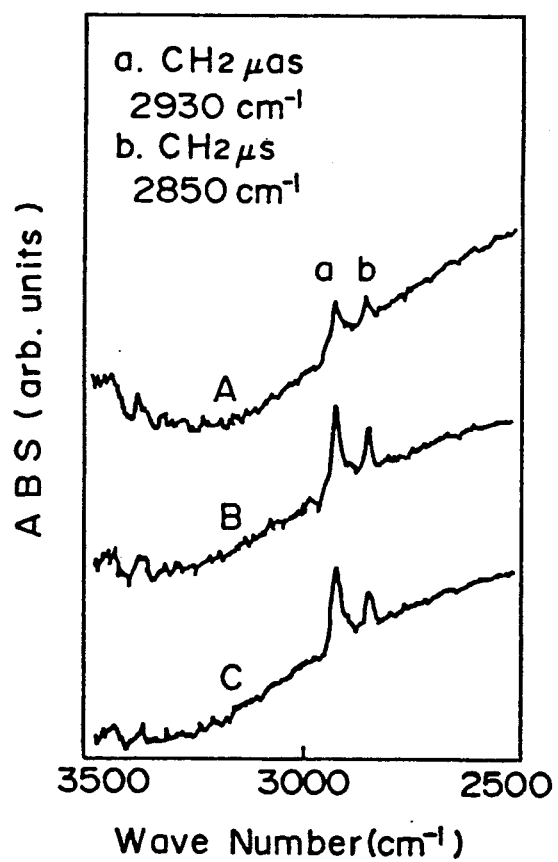
FIG. 3 shows experimental data.

Besides, as the experimental data of the invention, FT-IR spectra of monomolecular films formed by different techniques are shown in FIG. 3. First, spectrum A refers to the case of forming an adsorption film directly on the substrate surface without forming metal oxide film according to a conventional method (for example, U.S. Pat. No. 4,761,316), spectrum B represents the case of forming an adsorption film after forming a metal oxide film on the substrate surface according to this invention, and spectrum C is obtained by forming an LB film on the substrate in the same manner as in spectrum B by the LB method.

It is known from these spectra that the peak intensities of $CH_2$ $\mu as$ (2930 cm$^{-1}$) and $CH_2$ $\mu s$ (2850 cm$^{-1}$) are proportional to the molecular density in the film, and that spectrum C shows an intensity of a generally discussed monomolecular film, while spectrum B of this invention is high in molecular density because of strong peak intensity and spectrum A is low in the density because of weak peak intensity. Therefore, as the characteristics of the lubricating film proportional to the molecular density, spectrum B of this invention seems to be most superior.

Accordingly, in the protective film formed by the method of this invention, the lubricant and disc are tied firmly by covalent bond, and the lubricant is an ultrathin film in a thickness of one molecule high in the density arranged in the molecular order. Therefore, the enhancement of the wear resistance of the magnetic recording medium, for example, the magnetic disc surface may be achieved in a very thin film not experienced in the past and semipermanently.

What we claim is:

1. A method of forming a protective film on a magnetic recording medium, consisting essentially of the steps of:

preliminary forming a metal oxide film on a surface of a magnetic recording layer formed on a magnetic disc substrate, said metal oxide film comprised of a member selected from the group consisting of molybdenum oxide, titanium oxide, and tungsten oxide, and forming a chemically adsorbed monomolecular film on said metal oxide film by immersing said magnetic disc substrate in a nonaqueous solvent solution containing a silane surface-active agent having a chloro-silyl group and a hydrocarbon chain, wherein the film is composed of the silane surface-active agents and wherein all of the silane surface-active agents composing the film are bonded covalently to the metal oxide film in an aligned monomolecular layer.

2. A method according to claim 1, wherein said silane surface-active agent contains fluorine atoms instead of hydrogen atoms in the hydrocarbon chain.

* * * * *